United States Patent [19]

Dempsey

[11] Patent Number: 4,691,685

[45] Date of Patent: Sep. 8, 1987

[54] SAWBLADE COLLAR ASSEMBLY

[76] Inventor: Edward J. Dempsey, 16482 Barnstable Cir., Huntington Beach, Calif. 92649

[21] Appl. No.: 881,637

[22] Filed: Jul. 3, 1986

Related U.S. Application Data

[63] Continuation-in-part of Ser. No. 705,982, Feb. 27, 1985, abandoned.

[51] Int. Cl.[4] .......................... B28D 1/04; B23P 19/00

[52] U.S. Cl. ...................................... 125/14; 29/426.1; 29/526 R; 51/168

[58] Field of Search ................. 125/13 R, 14; 51/168; 29/526 R, 426.1

[56] References Cited

U.S. PATENT DOCUMENTS

| | | | |
|---|---|---|---|
| 2,572,042 | 10/1951 | Martin | 51/168 |
| 2,586,530 | 2/1952 | Godfrey | 51/168 |
| 3,464,165 | 9/1969 | Meredith | 51/168 |
| 3,753,430 | 8/1973 | Oas | 125/14 |
| 4,375,212 | 3/1983 | Santschi | 125/14 |

*Primary Examiner*—Harold D. Whitehead
*Attorney, Agent, or Firm*—Freilich, Hornbaker, Rosen & Fernandez

[57] ABSTRACT

A collar assembly is described, for use on a concrete cutter, which enables the major portion of the machine to be easily detached from a stuck sawblade and moved forwardly or rearwardly away from the blade so the blade can be cut out. The outer end of the shaft has a recess of the same diameter as the hole in the blade, and has a smaller threaded hole therein. The outer blade plate which lies on a face of the blade opposite the shaft, has a projecting collar that passes through the hole in the blade and into the recess in the face of the shaft, and a screw passing through the parts fastens them together.

2 Claims, 3 Drawing Figures

FIG. 1
PRIOR ART
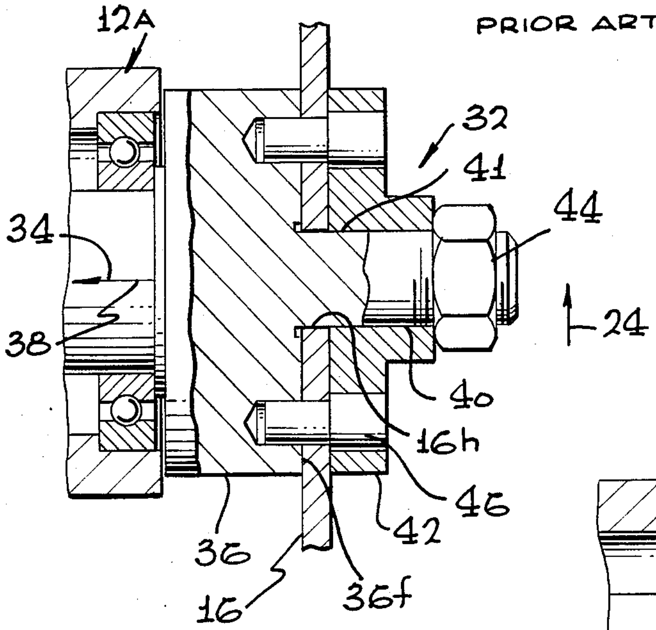
FIG. 2
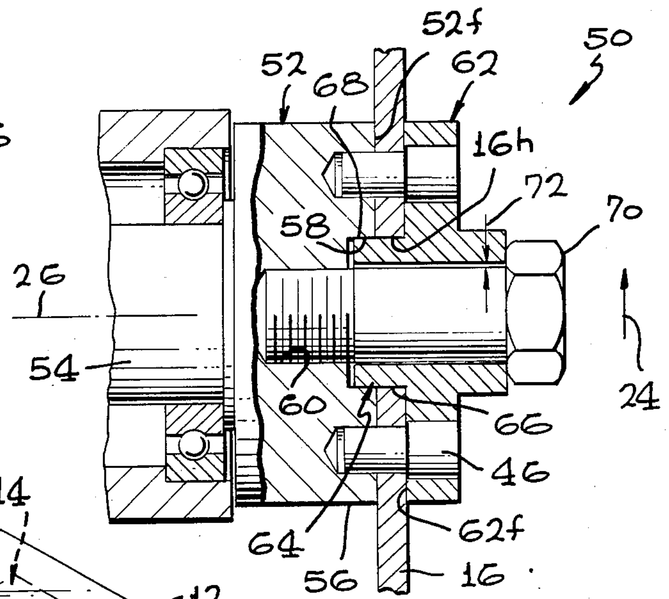
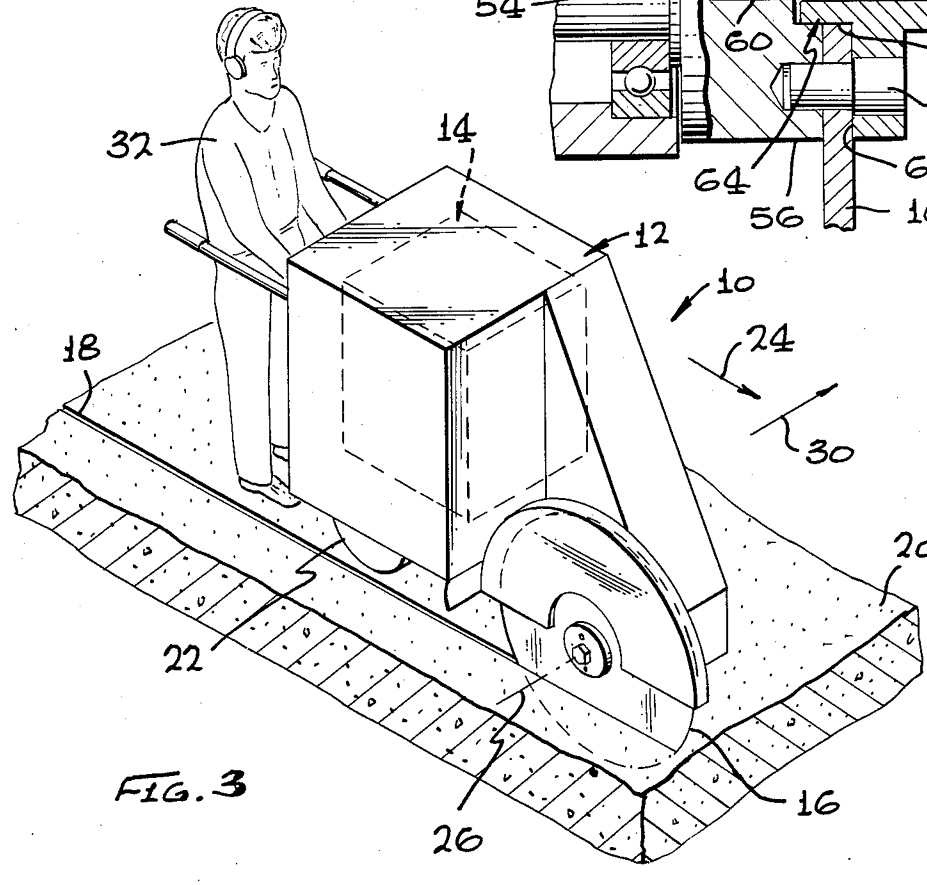
FIG. 3

SAWBLADE COLLAR ASSEMBLY

CROSS-REFERENCE TO RELATED APPLICATION

This is a continuation-in-part of U.S. application Ser. No. 705,982, filed Feb. 27, 1985 and now abandoned.

BACKGROUND OF THE INVENTION

A concrete cutter for cutting pavement or other structures, can include a heavy driver containing an engine which drives a diamond sawblade that can cut a groove in the concrete. It is important that the blade rotate about an axis precisely concentric with the central hole in the blade, which is in turn precisely concentric with the periphery of the blade. The diamond teeth each takes a small cut such as 1/10,000th inch, so a blade mounted off-center by over one or two thousandths inch would cut with much less than one-half of the blade periphery until the periphery were worn concentric with the rotation axis. In prior art machines, the output shaft of the driver has an outer shaft end which included a cylindrical projection of the same diameter as the central hole of the blade and which fits therein. An outer blade plate fits against the other face of the blade and is attached to the cylindrical projection at the outer end of the shaft. Since the shaft rotates precisely about its axis and the axis of its cylindrical projection, this arrangement assures that the blade will rotate precisely about its blade axis.

When cutting concrete or asphalt on hot days, a diamond blade often becomes "pinched" in the cut because of pavement expansion. In order to cut out the blade from the pavement, it is desirable to move the heavy driver out of the way. However, the driver is constructed to move only along a predetermined drive direction perpendicular to the shaft axis. As a result, the cylindrical projection at the end of the proir art shaft cannot be easily withdrawn from the hole of the blade. The driver is a heavy vehicle, typically weighing 1,000 to 1,500 pounds, so it is very difficult for the operator of the driver to move the machine sideways. An arrangement which permitted detachment of a stuck blade from the drive shaft, would aid in removing a pinched blade, saving many man hours of labor and much machine damage from moving the machine sideways.

SUMMARY OF THE INVENTION

In accordance with one embodiment of the present invention, a blade mounting assembly is provided which facilitates detachment of the driver from a stuck blade. The blade is sandwiched between the outer end of the output shaft and an outer blade plate. The outer end of the shaft has a recess precisely centered on the shaft axis of rotation, and the outer blade plate has a projecting collar of the same diameter as the hole in the blade and which fits closely within the shaft recess. A fastener projects along the axis of the shaft through the outer blade plate into the shaft. When the blade is stuck, the outer blade plate is removed and the driver can be easily moved away from the blade by moving the driver parallel to its drive direction along the ground.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a portion of a concrete cutting saw constructed in accordance with the prior art, showing the blade mounting assembly thereof.

FIG. 2 is a partial sectional view of a concrete cutting saw constructed in accordance with the present invention, showing the blade mounting assembly thereof.

FIG. 3 is a perspective view of a concrete cutting saw constructed in accordance with the invention.

DESCRIPTION OF THE PREFERRED EMBODIMENT

FIG. 3 illustrates a concrete cutting saw 10 whose overall appearance is similar to those of the prior art and of the present invention. The cutting saw includes a driver 12 which has an engine 14 that drives a circular sawblade 16 to form a cut 18 in the form of a slot, in a concrete floor, road, or the like 20. The engine also drives wheels 22 that move the driver along the ground along a predetermined drive direction 24. The concrete cutting saw is designed to cut a straight slot, and moves with ease only parallel to the drive direction 24 and resists movement in a direction perpendicular thereto. The drive direction is accurately perpendicular to the axis 26 about which the sawblade turns. The driver 12 weighs a plurality of hundreds of pounds, with a typical driver weighing about 1,000 to 1,500 pounds.

When cutting concrete on hot days, the diamond blade 16 often becomes "pinched" in the cut 18 due to pavement expansion. The blade 16 can be cut out from the concrete, but only by first removing the driver 12 from the immediate area to gain access to the area around the blade. This has been difficult in the prior art, because such removal of the blade from the driver previously required movement of the driver in a direction 30 perpendicular to the drive direction 24. Since the cutting saw was designed to move only along the drive direction 24 and in an opposite reverse direction, and weighed a plurality of hundreds of pounds, it was very difficult for the operator 32 to shift the driver sidewardly.

FIG. 1 shows the prior art blade mounting assembly 32 which required movement of the driver 12A in a direction 34 parallel to the axis 38 of the output shaft 36 in order to remove the driver from the sawblade 16. The diamond sawblade 16 has a central hole **16*h* which is precisely concentric with the periphery of the blade. It is also necessary that the axis 38 of the output shaft, about which the shaft turns, be precisely concentric with the hole 16*h* of the blade. This has been accomplished by forming the reduced-diameter projection 40 at the end of shaft to be precisely the same diameter as the hole 16*h* of the shaft, with only a very small clearance between them. Such clearance at 41** is no more than about one or two thousandths inch.

An outer blade plate 42 fits over the projection 40, and a nut 44 was threaded onto a threaded end of the projection to sandwich the diamond blade between a flat end portion **36*f* of the shaft and the outer blade plate 42. Separate drive pins 46 projected through holes in the outer blade plate 42, the blade 16, and the shaft 36**, to transmit torque between the shaft and the blade.

While this arrangement results in high precision and reliability, it has the disadvantage that the driver has to be moved along the sideward or lateral direction 34 by a distance such as 2–3 inches, in order to completely withdraw the projection 40 from the blade. Only then can the driver be moved away from the blade location to permit a stuck blade to be cut out. It is very difficult to move the heavy driver 12A sidewardly without shifting it even a small amount along the drive direction 24, which is prevented by the small clearance 41 between the shaft 36 and the stuck sawblade.

FIG. 2 illustrates a blade mounting assembly 50 of the present invention, which facilitates disconnection of the blade 16 from an output shaft 52 of the driver. After disconnection of the blade, the driver can be moved out of the vicinity of the blade by moving the driver parallel to the drive direction 24 (either forward or in reverse), without first requiring lateral shifting of the heavy driver in the direction of the shaft axis 26. The mounting assembly permits this, while also assuring precise concentricity of the cnetral hole 16*h* of the blade with the axis 26 of the shaft.

The output shaft 52 of the driver, which includes a narrower shaft portion 54 and an enlarged blade-abutting portion 56, is formed with a circular recess 58 that is machined so it is precisely concentric with the shaft axis 26 about which the shaft turns. The shaft also has a threaded fastener-receiving hole 60 of smaller diameter than the recess 58 and which is substantially, though not necessarily precisely, concentric with the shaft axis 26. An outer blade plate 62 includes a projecting collar 64. The collar 64 includes an outer portion 66 lying within the hole in the blade, and an inner portion 68 which lies within the recess 58 in the outer end of the shaft. The blade is sandwiched between largely flat faces 52*f* and 62*f* of the shaft and plate.

The outer portion 66 of the collar is precisely concentric with the shaft axis 26 and is of the same diameter as the blade hole 16*h;* there is only a small clearance between them so that the blade is precisely concentric with the outer portion 66 of the collar. The clearances at 66 and 68 are each generally no more than about two-thousandths inch. The inner portion 68 of the collar is of the same diameter as the recess 58 in the shaft end, with only a very small clearance between, so that the outer blade plate is held concentric with the shaft axis 26. The assembly is most easily constructed by forming the recess 58 of the shaft to the same diameter as the hole 16*h* in the blade, and forming the collar 64 of a uniform diameter at both portions 66 and 68. As in the prior art, drive pins 46 are provided that project through holes in the outer blade plate 62, the blade 16, and the shaft 52, to transfer torque between the shaft and the blade. The assembly is held together by a bolt 70 which has a head lying outside the outer blade plate and a threaded end threaded into the threaded hole 60 of the shaft. A considerable clearance 72 is left between the outside of the bolt and the inside of the outer blade plate.

The expense of the blade mounting assembly 50 is about the same as the prior art assembly 32 of FIG. 1. The cost of machining the hole 58 in the shaft 52 so it is precisely concentric with the shaft axis, is about the same and perhaps less than the cost of forming the projection 40 of the prior art shaft which can involve machining away considerable amounts of metal. The cost of manufacturing the outer blade plate 62 of the present blade mounting assembly is somewhat greater than that of the prior art outer blade plate, but the expense is only slightly greater because the present plate 62 has only a single highly precise surface 64 which does not have to be machined precisely concentric to any other surface. The considerable savings in time in removing a stuck blade easily exceeds any extra cost of constructing the present blade mounting assembly.

A diamond blade such as 16 takes a very small cut, such as 1/10,000th inch, per revolution. If the blade is rotated about an axis that is displaced from the periphery of the blade by 1/10,000th inch, then only one side of the blade will do all the cutting, and perhaps $\frac{3}{4}$ths of the blade will do no cutting. This would result in rapid wear of the blade and in very slow cutting until the periphery is worn concentric with the axis of rotation. Thus, the tolerances to which the shaft recess 58 and plate collar 66 must be held are very tight, and generally no more than about 2/1,000th inch (0.002 inch) and preferably no more than about 1/1,000th inch. The concentricity of the shaft axis and recess, and the diameters of the shaft recess and the collar, should be of high precision: that is, they should be no more than about 2/1,000th inch. The present arrangement, wherein a recess is formed in the shaft concentric with the shaft axis, and the outer blade plate has a collar that is very closely received within the shaft recess and the blade hole, permits the maintenance of very precise mounting of the blade on the shaft, while also permitting rapid disengagement of the driver from the blade so it can move parallel to its drive axis away from the location of a stuck blade. The arrangement is also useful for a heavy rack-mounted wall saw.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A concrete cutting saw which can move along a concrete surface while cutting a slot in the surface, comprising:

a driver which has means which supports it in movement along predetermined opposite forward and rearward drive directions along a surface and which weighs a plurality of hundreds of pounds so it cannot be easily moved sidewardly in a horizontal direction perpendicular to said drive direction, said driver having a motor device with an output shaft that can rotate about a shaft axis perpendicular to said drive direction and which has a largely flat face for abutting a face of a circular sawblade;

a circular diamond sawblade having a central hole, said blade having one face abutting said flat shaft face;

an outer blade plate which abuts a second face of said blade;

said shaft end has a fastener-receiving hole of smaller diameter than said blade hole lying on said axis, and has a recess which is shallower than said fastener-receiving hole and of no greater diameter than said blade hole and centered on said shaft axis;

said outer blade plates has a main plate portion with a largely flat face that abuts a face of the blade, and has a projecting collar with a blade-engaging portion of the same size as the blade hole and lying therewithin and a recess-engaging portion of the same diameter as said shaft recess and lying there, with a clearance between the collar and blade hole no more than about two-thousandths inch and a clearance between the collar and shaft recess no more than about two-thousandths inch to precisely center the shaft on the blade, said outer blade plate having a central hole; and a fastener extending through said central hole in said outer blade plate and said fastener-receiving hole in said shaft to fasten said outer blade plate to said shaft, the clearance between the fastener and the central hole being greater than the clearance between the blade and the blade-engaging portion of the collar, whereby to enable precision blade mounting and to enable the driver to move parallel to said drive direction while a detached stuck blade remains stuck in place.

2. A method for attaching a concrete-cutting diamond sawblade to the shaft of a heavy driver which weighs a plurality of hundreds of pounds and can easily move in a predetermined drive direction along a surface but not perpendicular thereto, wherein the shaft rotates about an axis perpendicular to said drive direction, and for detaching the driver from a sawblade that is stuck in concrete comprising;

attaching said sawblade including projecting a collar of an outer blade plate through a close-fitting hole in said sawblade and into a close-fitting recess at the end of said driver shaft, pressing a face of the outer blade plate against a face of the sawblade, and fastening said collar to said shaft, while maintaining all of the shaft on a side of said sawblade which is opposite said face of the outer blade plate;

detaching said driver from said sawblade when the sawblade is stuck in concrete, including unfastening said collar from said shaft, withdrawing said collar from said shaft and sawblade by moving said collar along said shaft axis away from the driver, and moving the driver along said drive direction away from the vicinity of said stuck sawblade.

* * * * *